(12) United States Patent
Hassan-Shafique et al.

(10) Patent No.: US 8,180,490 B2
(45) Date of Patent: May 15, 2012

(54) VIDEO-BASED SENSING FOR DAYLIGHTING CONTROLS

(75) Inventors: Khurram Hassan-Shafique, Ashburn, VA (US); Niels Haering, Reston, VA (US); Soma Biswas, Greenbelt, MD (US); Alan J. Lipton, Herndon, VA (US)

(73) Assignee: ObjectVideo, Inc., Reston, VA (US)

( * ) Notice: Subject to any disclaimer, the term of this patent is extended or adjusted under 35 U.S.C. 154(b) by 1102 days.

(21) Appl. No.: 12/007,027

(22) Filed: Jan. 4, 2008

(65) Prior Publication Data

US 2008/0180553 A1 Jul. 31, 2008

Related U.S. Application Data

(60) Provisional application No. 60/878,671, filed on Jan. 5, 2007.

(51) Int. Cl.
*G05D 3/12* (2006.01)
*H04N 5/235* (2006.01)

(52) U.S. Cl. ..................... 700/275; 348/221.1
(58) Field of Classification Search .................. 700/275; 348/222.1, 223, 224, 229, 234, 296
See application file for complete search history.

(56) References Cited

U.S. PATENT DOCUMENTS

| | | | | |
|---|---|---|---|---|
| 4,176,955 A * | 12/1979 | Yamada et al. | ............... | 356/222 |
| 4,445,778 A * | 5/1984 | Nakauchi | ..................... | 356/222 |
| 4,969,045 A * | 11/1990 | Haruki et al. | ............... | 348/229.1 |
| 5,264,940 A * | 11/1993 | Komiya et al. | ............... | 348/298 |
| 5,424,543 A * | 6/1995 | Dombrowski et al. | ........ | 250/330 |
| 5,818,597 A * | 10/1998 | Hibbard et al. | ............... | 356/121 |
| 5,929,909 A * | 7/1999 | Hoelzemann et al. | ........ | 348/372 |
| 6,519,037 B2 * | 2/2003 | Jung et al. | ..................... | 356/419 |
| 7,638,747 B2 * | 12/2009 | Fujie | ......................... | 250/208.1 |
| 7,697,062 B2 * | 4/2010 | Wernersson | .................. | 348/371 |
| 2004/0070565 A1 * | 4/2004 | Nayar et al. | .................. | 345/156 |
| 2005/0110416 A1 * | 5/2005 | Veskovic | ..................... | 315/149 |
| 2005/0117799 A1 * | 6/2005 | Fuh et al. | ..................... | 382/169 |
| 2006/0001683 A1 * | 1/2006 | May et al. | ..................... | 345/661 |
| 2006/0018566 A1 * | 1/2006 | Coleman et al. | .............. | 382/312 |
| 2006/0071605 A1 * | 4/2006 | Diederiks | ........................ | 315/76 |
| 2006/0126338 A1 * | 6/2006 | Mighetto | ..................... | 362/294 |

(Continued)

FOREIGN PATENT DOCUMENTS

EP 409161 A2 * 1/1991

(Continued)

OTHER PUBLICATIONS

Morikawa et al., http://www19.ipdl.inpit.go.jp/PA1/cgi-bin/PA1DETAIL (e.g. machine translation).*

(Continued)

*Primary Examiner* — Albert Decady
*Assistant Examiner* — Darrin Dunn
(74) *Attorney, Agent, or Firm* — Venable LLP; Jeffri A. Kaminski

(57) ABSTRACT

A video imager may be used to measure the natural and/or artificial light levels in a space. The lighting estimates may be passed to a controller via a communication network. The lighting estimates may be in the form of actual radiance values, brightness, or other forms. The controller may determine if and which areas of the space require more light or if and which areas of the space have more light than required. Based on the lighting estimates, the controller may issue commands to turn on/off or dim/brighten the light from various ones or combinations of light sources in or around the space via actuators. The controller may also directly interface with the light sources.

26 Claims, 18 Drawing Sheets

U.S. PATENT DOCUMENTS

| | | | |
|---|---|---|---|
| 2006/0133688 A1* | 6/2006 | Kang et al. | 382/254 |
| 2006/0176370 A1* | 8/2006 | Chen et al. | 348/148 |
| 2006/0182367 A1* | 8/2006 | Moghaddam | 382/276 |
| 2008/0158258 A1* | 7/2008 | Lazarus et al. | 345/634 |
| 2008/0186380 A1* | 8/2008 | Zhang et al. | 348/143 |
| 2008/0260373 A1* | 10/2008 | Bell et al. | 396/213 |
| 2009/0268023 A1* | 10/2009 | Hsieh | 348/143 |

FOREIGN PATENT DOCUMENTS

| | | | |
|---|---|---|---|
| JP | 60196734 A | * | 10/1985 |
| JP | 01091083 A | * | 4/1989 |
| JP | 01233572 A | * | 9/1989 |
| JP | 03042557 A | * | 2/1991 |
| JP | 07299029 A | * | 11/1995 |
| JP | 10162967 A | * | 6/1998 |
| JP | 2002289377 A | * | 10/2002 |
| JP | 2002299070 A | * | 10/2002 |
| JP | 2007265120 A | * | 10/2007 |

OTHER PUBLICATIONS

International Search Report dated May 1, 2008.
Written Opinion dated May 1, 2008.

* cited by examiner

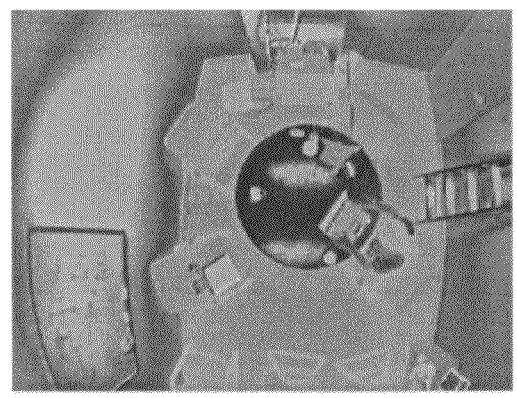
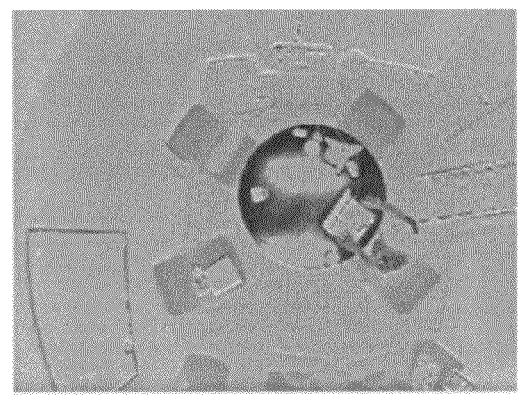
Figure 14

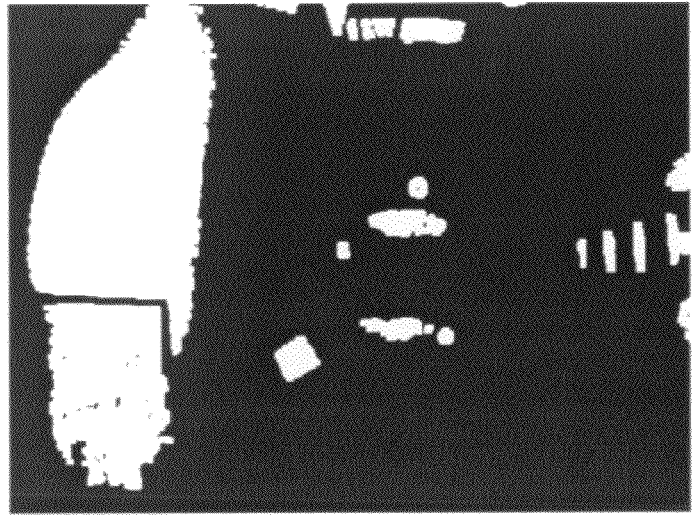
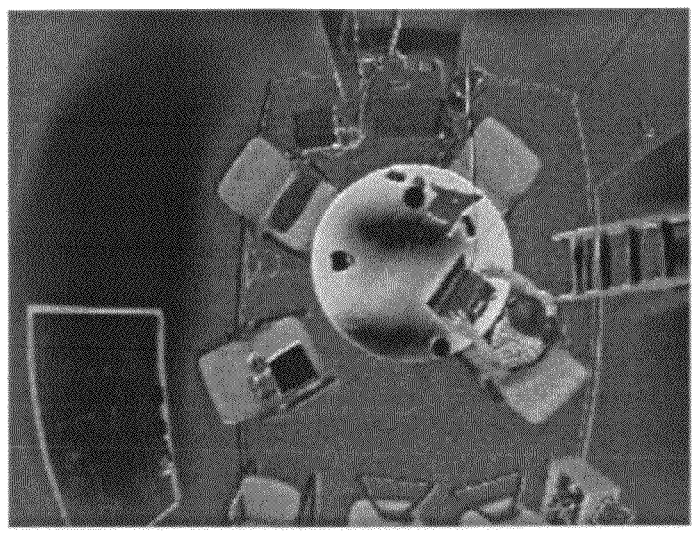
$$I = \begin{cases} 0 \, (\mathit{diffuse}) & \text{if } \sqrt{U^2+V^2}/S > Th_1 \\ 1 \, (\mathit{specular}) & \text{otherwise} \end{cases}$$
$\sqrt{U^2+V^2}/S$
Figure 15

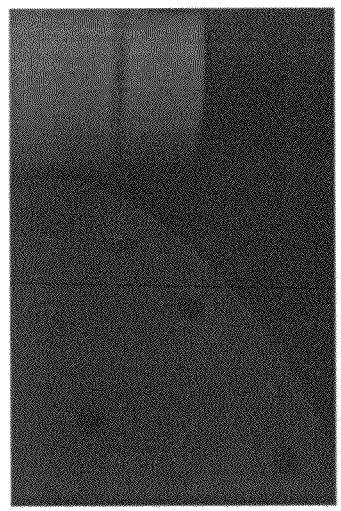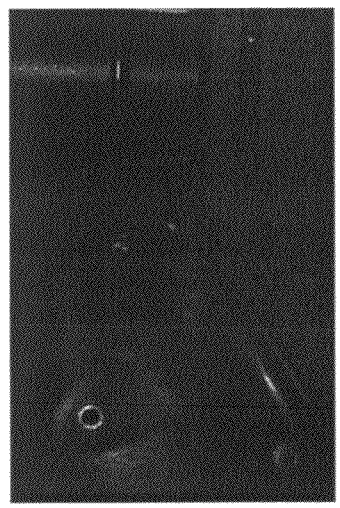
Figure 16

VIDEO-BASED SENSING FOR DAYLIGHTING CONTROLS

FIELD

The following relates to video based intelligent photo-sensing and its usage in day-lighting control systems.

BACKGROUND

Day-lighting is the mechanism of providing controlled admission of natural light into a space through windows to reduce or eliminate electric lighting usage. The benefits from architectural day-lighting are maximized when photo-sensors are used to control the electric lighting system. Photo-sensors estimate the amount of light in their field of view and enable automatic adjustment of the output level of electric lights based on the amount of light detected through control devices. The estimation of the illumination level in a room allows utilization of day-lighting when available and increases the lighting levels only when required, while keeping the illumination level of the space constant. Threshold on and off values can be set to respond to specific lighting conditions. Based on the estimated illumination level, the photo-sensor can operate on/off switching of various lights or a continuous dimming system for greater user satisfaction.

While existing photo-sensors have large fields of view, their operation is limited by the fact that their output is based on the total amount of light in their field of view. This mode of operation is especially disadvantageous when the task-area does not directly receive the light and is darker as compared to its surrounding areas. Similarly, if there are multiple task-areas in a given space, multiple photo-sensors are required to independently control the lighting of these areas, thus increasing the cost and complexity of the control systems. It is desirable that a single sensor measure the illumination levels (both global and local) of different areas in a space independent from each other and to control multiple devices accordingly.

SUMMARY

Embodiments provide a method of video-based day-lighting control, comprising receiving video image information about a scene, the video image information comprising an image sequence including a plurality of images of the scene; determining a light estimate for the scene based on the video image information; regulating light provided to the scene based on the light estimate. Additional embodiments provide a system for day-lighting control, comprising a video imager to determine light levels in a space from an image stream; a controller to receive the light levels; to determine if the light levels are within an acceptable range, and to issue commands to control the amount of light from light sources based on the determination; and an actuator to receive the commands from the controller and to control the amount of light from the light sources based on the commands.

Additional embodiments provide a system, comprising a video imager adapted to create a video image stream of a space, receive input defining a plurality of areas of interest in the space, and determine a light estimate for each area of interest; and a controller adapted to receive the light estimate and provide a control signal to control light from a light source.

BRIEF DESCRIPTION OF THE DRAWINGS

The foregoing and other features and advantages of the invention will be apparent from the following, more particular description of the embodiments of the invention, as illustrated in the accompanying drawings.

FIG. 14 illustrates examples of S, U, V components of an RGB image in SUV space.

FIG. 15 illustrates an example of a ratio of norm of diffuse components and the specular component and the thresholded image with specular regions as white and diffuse regions as black.

FIG. 16 shows an example of a specularity map and diffuse RGB image of an RGB image.

DETAILED DESCRIPTION

Embodiments relate to video sensors and analytics for measuring illumination and day-lighting control for energy management. Video-based systems are becoming increasingly popular in different businesses and industries for the tasks of monitoring and surveillance. The output of a video sensor is an image stream where the brightness of each pixel of an image is proportional to the amount of light radiating from the corresponding world location. In the image formation process, the light emitting from each world position (radiance) in the video sensor's field of view is passed through a variable aperture lens for a fixed amount of time (exposure time). The amount of light allowed through the lens depends on the exposure time, focal length of the camera, diameter of the lens (aperture) and the angle that the principle ray makes with the optical axis.

The light then strikes a sensor array, such as charge-coupled device (CCD) array or complementary metal-oxide-semiconductor (CMOS) at the back of the video sensor. The light is collected by the sensor array and is converted into an image, where the brightness of the image is proportional to the intensity of collected light. For instance, the CCD array is composed of a rectangular grid of electron-collection sites laid over a thin silicon wafer to record a measure of the amount of light energy reaching each of them. When photons strike the silicon, electron-hole pairs are generated during a photo-conversion process and the electrons are captured by each site of the grid. The electrons generated at each site are collected over the exposure time of the video sensor. The amount of charge stored at each site of the CCD array determines the brightness of output image at the corresponding pixel. The brightness values of the output image have a one-to-one relation with the radiance values in the video sensor's dynamic range. Thus video sensors provide an excellent means of independent estimation of lighting levels at different locations of an area (one measurement per image pixel). Additionally, as opposed to existing photo-sensors, a video sensor can measure lighting levels both globally (for the whole space) and locally (for user-specified regions in the space) simultaneously.

Accordingly, independent estimation of lighting levels at different areas of the space may be enabled. These estimates may be in the form of brightness, actual radiance values, discrete messages specifying whether the lighting levels are within a desired range or other forms. These estimates of lighting levels can be used to control both artificial and natural lighting (for example, by turning on/off individual lamps in a ballast or opening the window shades). The desired range of lighting may be determined both automatically and user-supervised for each area of interest. Natural lighting may be utilized and electrical energy usage may be minimized.

Illumination Sensing for Lighting Control

Figure 1:
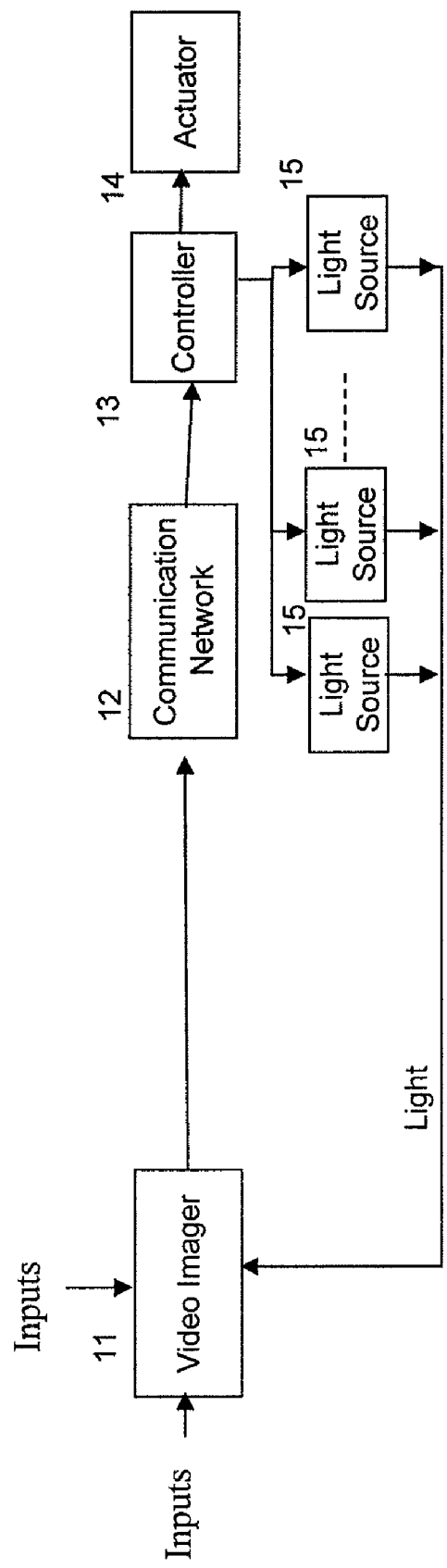
FIG. 1 is an illustration of an exemplary embodiment of the video based photo-sensor for lighting control of the present invention.

An exemplary video-based sensor is shown in FIG. 1. A video imager (11) may be used to measure the natural and/or artificial light levels in a space. The lighting estimates may be passed to a controller (13) via a communication network (12), for example, using wired or wireless communication, such as ZigBee, Z-Wave, BACNET, etc. The lighting estimates may be in the form of actual radiance values, brightness, or other forms. The controller (13) may determine if and which areas of the space require more light or if and which areas of the space have more light than required. Based on the lighting estimates, the controller (13) may issue commands to turn on/off or dim/brighten the light from various ones or combinations of light sources (15) in or around the space via actuators (14). The controller (13) may also directly interface with the light sources (15). The process of lighting control may be repeated with changes in the interior or exterior lighting conditions thus providing a feedback loop to keep the lighting levels in the space substantially constant.

In another example, the video imager (11) may determine whether the lighting estimates are within a desired range and sends discrete messages to the controller (13) about the status of current lighting of the space with respect to the desired range. The messages may include information whether the lighting estimates are within, higher than or lower than the desired range. The controller (13) may provide commands to the actuator (14) accordingly. Examples of the desired range of lighting may include:

pre-configured with commonly accepted comfortable lighting values, specified by a user in the form of radiance values, or specified by a user by dimming and brightening the lights while the video sensor is in a learning mode. In the learning mode, the video sensor may automatically determine the correct radiance values or thresholds based on the light levels set by the user.

automatically learned by the video sensor by observing the area during normal usage periods.

Holistic Lighting Control

Figure 2:
FIG. 2 shows different areas of interest (shaded with different colors) in a scene.

The video sensor may also create a holistic control paradigm for a large area using individually controlled light sources. For example, the video imager (11) may independently measure lighting levels in different areas of interest in the space. An area of interest (AOI) may be any area within or adjacent to the space so designated. FIG. 2 illustrates some examples of areas of interest. Here, the areas of interest X, Y, Z are designated by outlining and shading.

The video sensor may determine which areas of the space are darker and lighter and therefore which areas require more or less light. This may be done based on the desired range or the light estimate, as described in the preceding sections. The light sources (15) may be controlled individually for each space or area of interest. For example, the information regarding the light estimate or range may be provided from the video imager (11) via a communication network (12) to the controller (13). The controller (13) may then determines those areas which need their lighting adjusted and provides the appropriate commands to the actuator (14). The actuator (14) may then control individual ones or combinations of light sources (15) appropriately. Again, the process of lighting control may be repeated to provide a feedback loop keeping the lighting levels in the spaces or areas of interest substantially constant.

The areas of interest shown in FIG. 2, for example, may be specified in various ways. For example, the areas of interest may be specified:

By using a graphical user interface to draw the areas of interest on the image.

By placing markers such as LEDs, radio beacons, etc, to denote the corners/boundaries of the areas of interest.

By letting someone "pace out" the areas of interest (i.e., move within the area of interest especially covering the boundary of the area) while the video sensor is in a learning mode. The video sensor may track the movement around the space to define the area of interest.

By the video sensor learning the space usage based on statistics of occupancy.

By the video sensor learning the effect of each artificial or natural light source in the space or area of interest by varying the amount of light from the light source. The video sensor may then partition the space area of interest according to the flexibility of control available by controlling individual ones or groups of the lights sources.

Independent Lighting Control (Photo-Stat)

Figure 3:
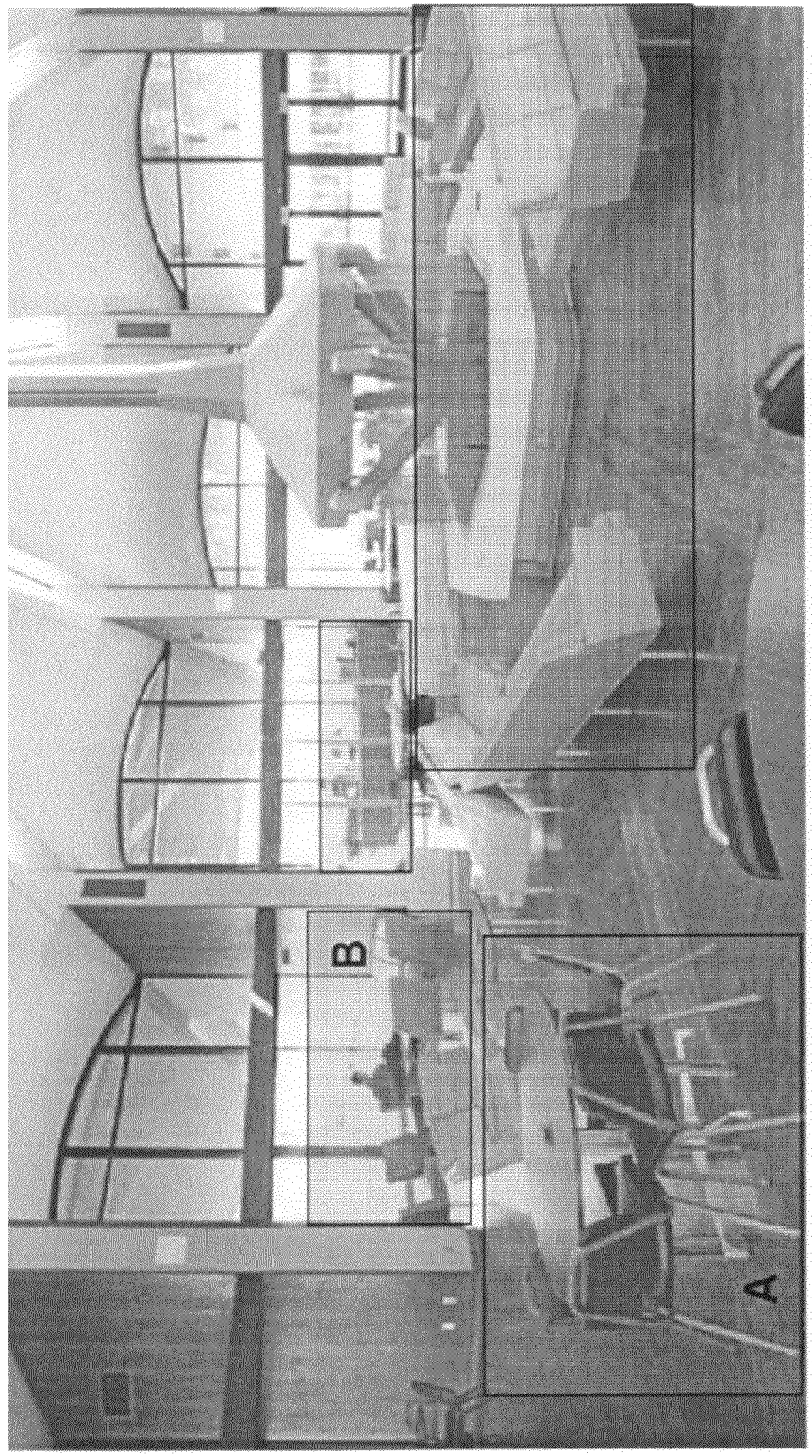
FIG. 3 shows an exemplary scene with different areas of interest.

The video sensor may also allow individual control of specific areas of interest. In this case a desirable lighting range can be defined for each area of interest. For example, in an office environment, each user can define preferable range (photo-stat) for his/her cubicle or seating area. The video sensor may maintain this photo-stat by using the proper combination of natural and artificial light. For example, FIG. 3 illustrates a space with various specific areas of interest indicated in the space by outlining. One area of interest, A, may include a table and chairs which are spaced apart from the windows. Another area of interest, B, may include a desk and chairs and be adjacent to a window. The lighting for each area of interest may be individually specified and controlled. When the lighting in one area of interest is adjusted, it may affect the lighting in a nearby area of interest. By utilizing the feedback control mentioned above, the lighting in each individual area of interest may be maintained.

The photo-stats may be provided manually or automatically. For example, the individual photo-stats can be manually provided by defining the radiance values or by dimming and brightening the lights while the video sensor is in a learning mode. In addition to the range of lighting levels, the photo-stat for an area of interest may also include the preferable amount of each type of lighting (i.e., artificial and natural) for additional user comfort. The photo-stats, areas of interest, light ranges, and other information may be inputs to the video sensor.

Illumination Sensing for Natural Lighting Control

In addition to the control of artificial light, the video sensor may also be used to control the amount of natural lighting entering a space. More than useful natural lighting can cause in excessive heating in the building and consequently increases HVAC usage. The video sensor may be used to optimize the usage of HVAC and lighting by using the lighting estimates to control the natural lighting. The system of FIG. 1 may also be used for controlling natural lighting. The control of natural lighting may be combined with control of artificial lighting into one system. Natural light controls may include, for example, shades and blinds (and other window treatments), skylights, electro-chromic windows, and window panels/covers, etc. The video sensor may also provide occupancy estimates, that is, a determination of when a space or AOI is occupied or vacant. Occupancy estimates may be generated by detecting the people in a field of view of the video sensor, for example, by known background modeling techniques. The occupancy estimates may be used to control natural and/or artificial light into the space or AOI by limiting or minimizing the passage of natural light in the area when the area is vacant.

Maintenance of Lighting and Control Infrastructure

In addition to controlling lighting, the video sensor may also be used for maintenance of lighting and control infrastructure of the building. The video sensor may know the effect of controlling each light source, for example, the effect on lighting, heating, etc. from a particular light source. For example, if the effect of turning on a lighting device is not as expected, the video sensor can send an alert to maintenance about a possible malfunction and its location.

Exemplary Light Sensing Processes

Light Sensing

Figure 4:
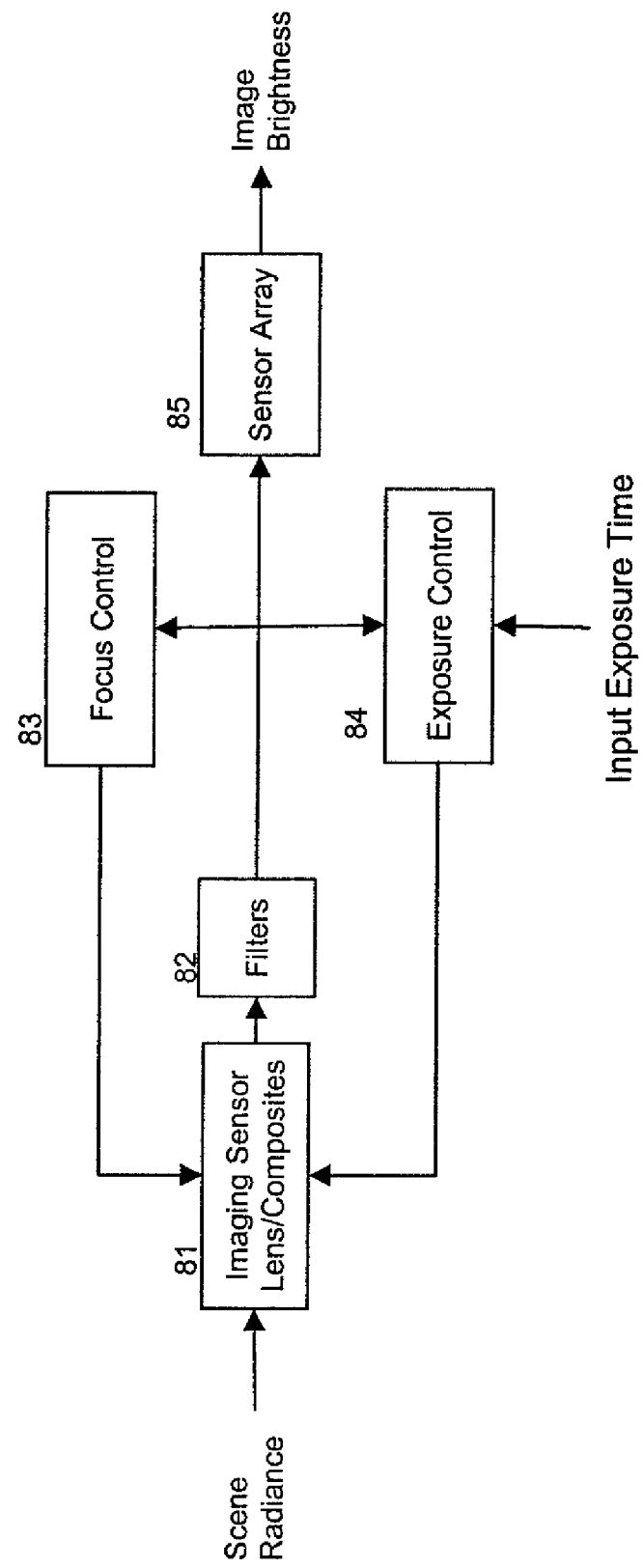
FIG. 4 is a block diagram of an exemplary imager.

Radiant light at every world point in the field of view of the video sensor may be measured by an imager. The imager may convert the measured light into the brightness values of corresponding pixel locations. The relationship between the brightness value of each pixel and the radiance of the corresponding world location is well known and is a function of imager response function, exposure time, and imager parameters such as lens aperture, focal length, and the angle that the principal ray makes with the optical axis. The imager may use image/video analytics and the knowledge of the physical process of image formation to determine the actual radiance values from pixel brightness. An exemplary implementation of a video imager 11 is shown in FIG. 4. Scene radiance may be focused to a sensor array (for example, CCD or CMOS) (85) by a scheme of lens (or lens composites) (81) and filters (82). Exposure and focus control mechanisms (83, 84) determine the sensor parameters (what parameters) at a given instant. Exposure values may also be provided through an external mechanism, such as, control software, to get the desired dynamic range. The image brightness may be output from the sensor array (85).

Iterative Radiance Estimation

Figure 5:
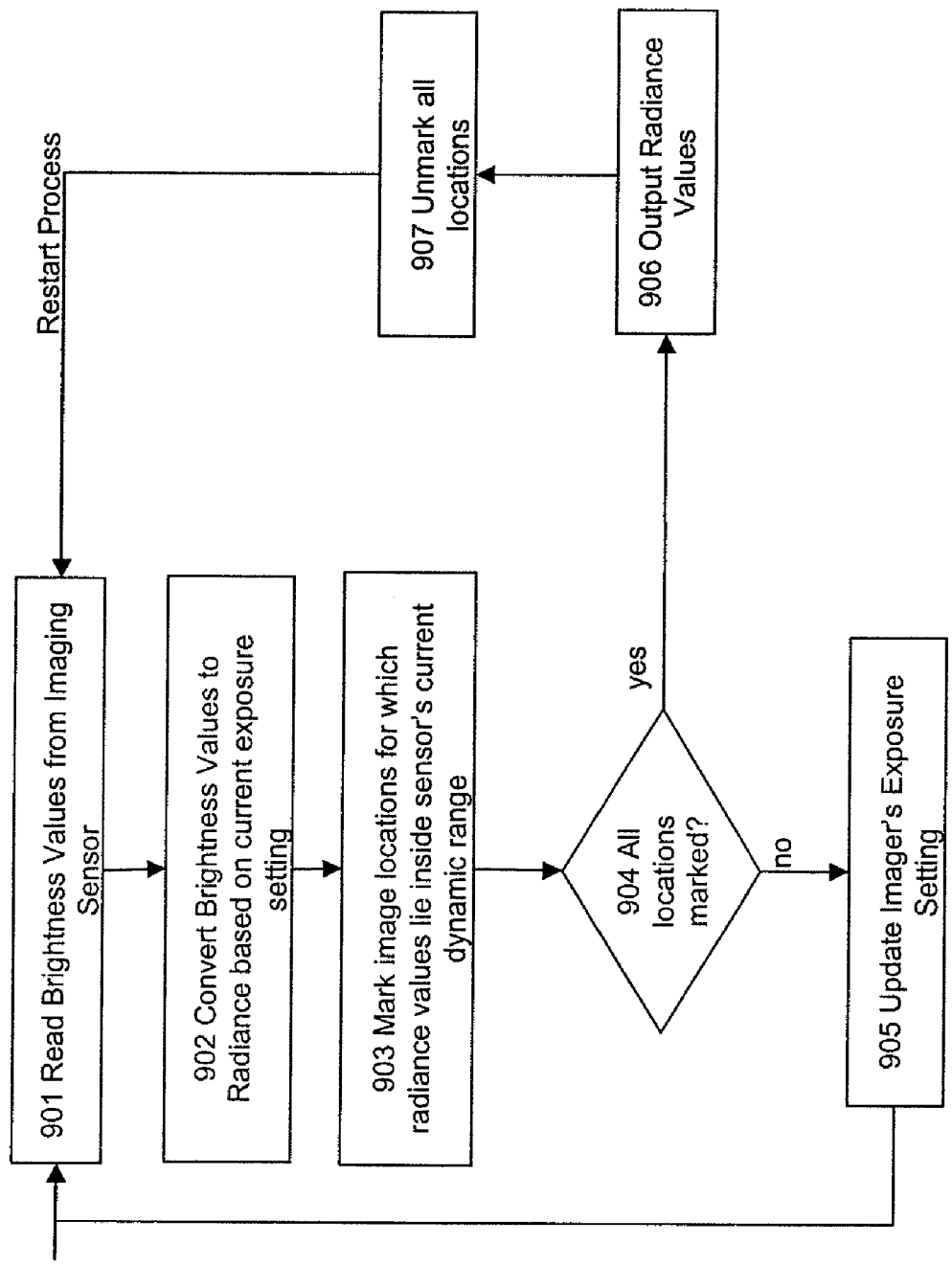
FIG. 5 is an illustration of an exemplary light sensing process.

A flow-chart of an exemplary procedure for iterative radiance estimation is shown in FIG. 5. The brightness values may be read from the video imager, (901). The radiance values for each image pixel may then be estimated (902). This may be done, for example, by using the image formation model and the knowledge of video imager response function. Each image location where the radiance value lies inside the current dynamic range are marked (903). If the radiance value of any pixel is outside the dynamic range of the imager (as dictated by the exposure setting), the exposure setting may be increased or decreased accordingly and the new setting sent to the imager (904, 905). The estimated radiance may then be output (906). The marked locations may be unmarked and the process may be repeated until the radiance values for each image location (or the set of pre-selected image locations) have been estimated (907).

Radiance Estimation Using High Dynamic Range Imaging

Figure 6:
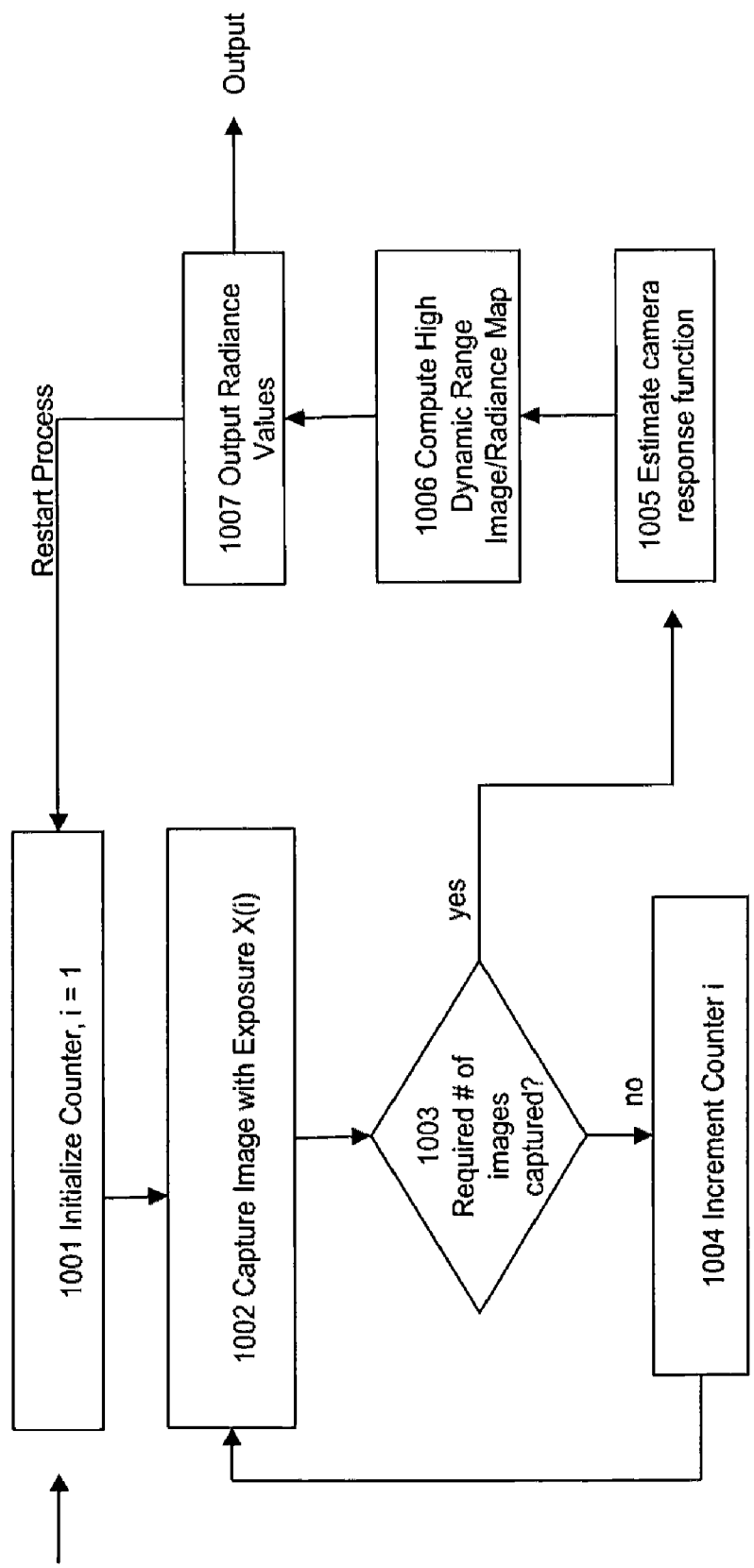
FIG. 6 is an illustration of an exemplary light sensing algorithm using High Dynamic Range (HDR) Imaging.

In another embodiment, the video sensor may utilize high dynamic range imaging to estimate scene radiance. A flow chart of an exemplary procedure is shown in FIG. 6. A counter is initialized (1001). Images are captured with varying, but known, exposure settings (1002). Images may be captured until the required number of images is obtained (1003). The counter may be incremented. The exposure setting is varied until the requisite number of images have been captured (1004). Once a required number of images are captured, a camera response function may be estimated (1005). The camera response function may be used to compute a high dynamic range (HDR) image or radiance map of the scene (1006). Several methods for computing HDR images are known, for example, [Paul E. Debevec and Jitendra Malik. Recovering High Dynamic Range Radiance Maps from Photographs, Proceedings of SIGGRAPH 97, Computer Graphics Proceedings, Annual Conference Series, pp. 369-378]. The radiance at each location may be directly available from the HDR map and output (1007). No further image capturing may be required. The process may be repeated as needed.

Light Sensing without Radiance Estimation/Differential Operation

Figure 7:
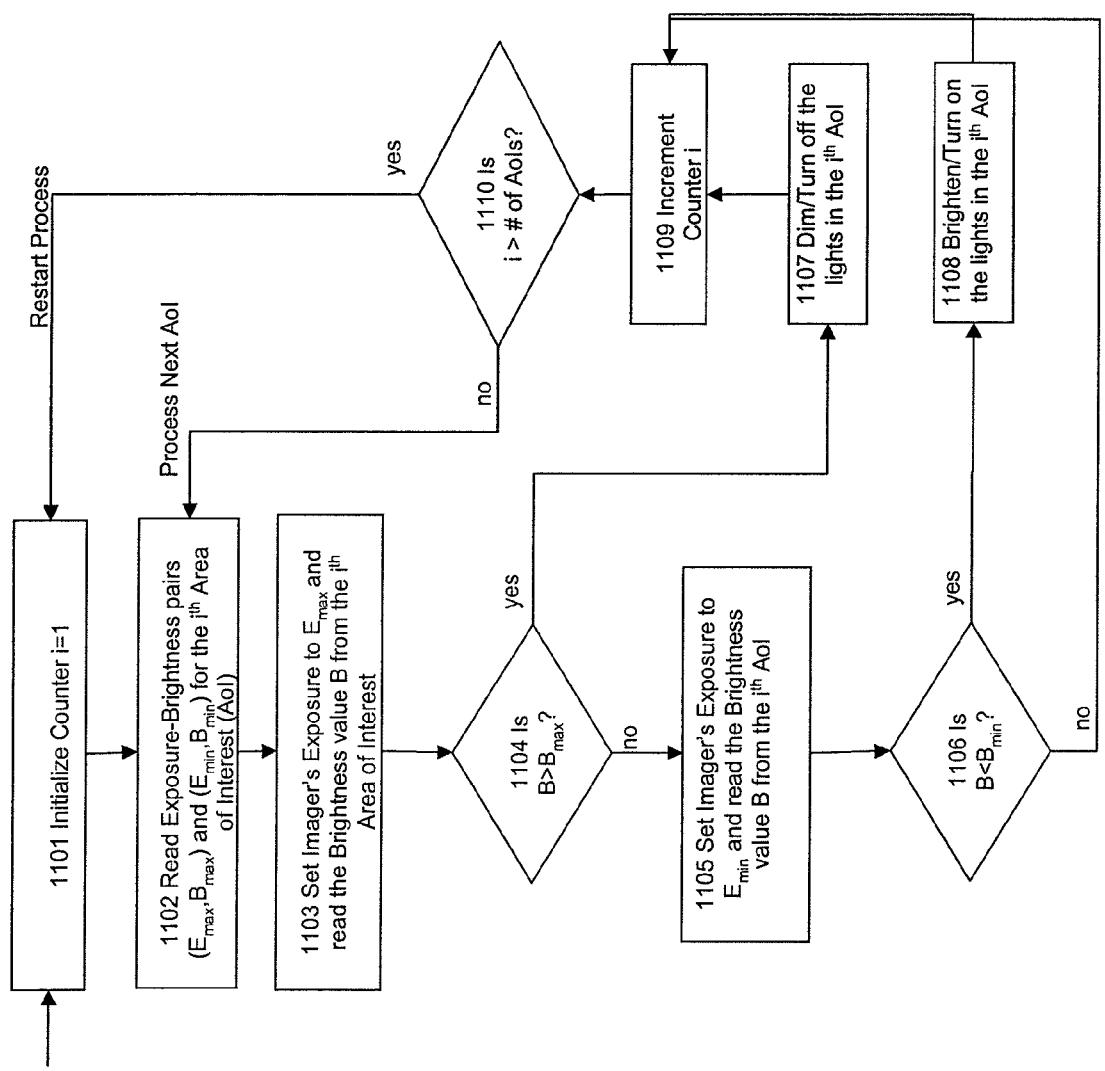
FIG. 7 is an illustration of the exemplary light sensing process in differential mode.

While working in a differential mode, i.e., when the video imager outputs the status of the current lighting condition in a given area instead of its radiance, the video sensor may operate on the brightness value and skip the radiance computation. In this case, the desirable lighting range may be in the form of image brightness values and the corresponding exposure setting, as described in more detail below. During the sensing mode, the video sensor may only sense the lighting levels at the known exposure settings and compare the brightness values with the stored brightness values. A flowchart of an exemplary process for a number of areas of interest is shown in FIG. 7. A counter may be set (1101). Exposure-brightness pairs, the minimum exposure and brightness ($E_{min}$, $B_{min}$) and the maximum exposure and brightness ($E_{max}$, $B_{max}$), are read for a given area of interest (1102). The exposure of the video imager is set to $E_{min}$ and $E_{max}$ in succession (1103, 1105) and compared to the measured brightness values with $B_{min}$ and $B_{max}$ respectively (1104, 1106). The decision to whether light from light sources is to be dimmed or brightened is taken based on these comparisons (1107, 1108). The counter may be incremented (1109). After all the AOIs have been processed, the process may start over the first AOI, otherwise, the process may be repeated for the next AOI (1110).

Learning Desirable Light Ranges

Instead of a user providing desired radiance values, the video sensor may optionally learn the desirable ranges from the user-controlled environment. This may be done in both supervised and unsupervised fashion as described below.

Learning Desirable Light Ranges with User Interaction

In the supervised case, the user may set the lighting level in a selected area to the maximum value of the desirable range. The video sensor may determine the lighting level in the space or area of interest (either by using the HDR image computed as using the process of FIG. 6 or by automatically selecting the right exposure as in the processes of FIGS. 5 and 7) and set this value as the maximum value of the desirable range. The same process may then be repeated for the minimum value of the desirable range. Once the learning is complete, the video sensor may operate in its normal mode of sensing.

Figure 8:
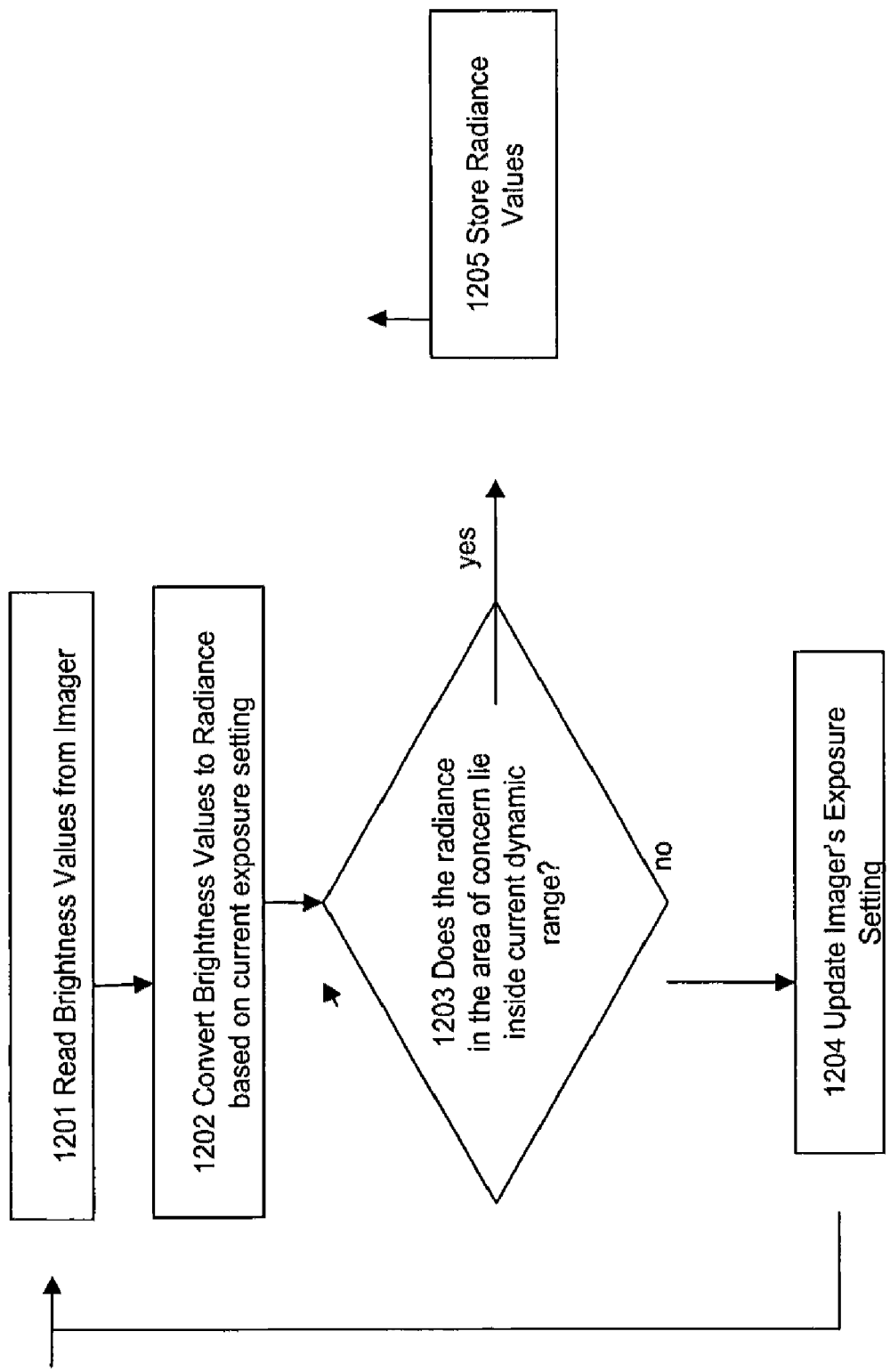
FIG. 8 is an illustration of an exemplary process for learning desirable radiance range with user interaction.

FIG. 8 illustrates an exemplary process. The brightness values may be read from the video imager (1201). The brightness values may be converted into radiance based on the current exposure setting (1202). If the radiance in the selected area is within the dynamic range, the radiance value is stored, (1203, 1205). Otherwise, the exposure setting is updated and the process is repeated (1204).

Learning Desirable Light Ranges During Differential Operation

Figure 9:
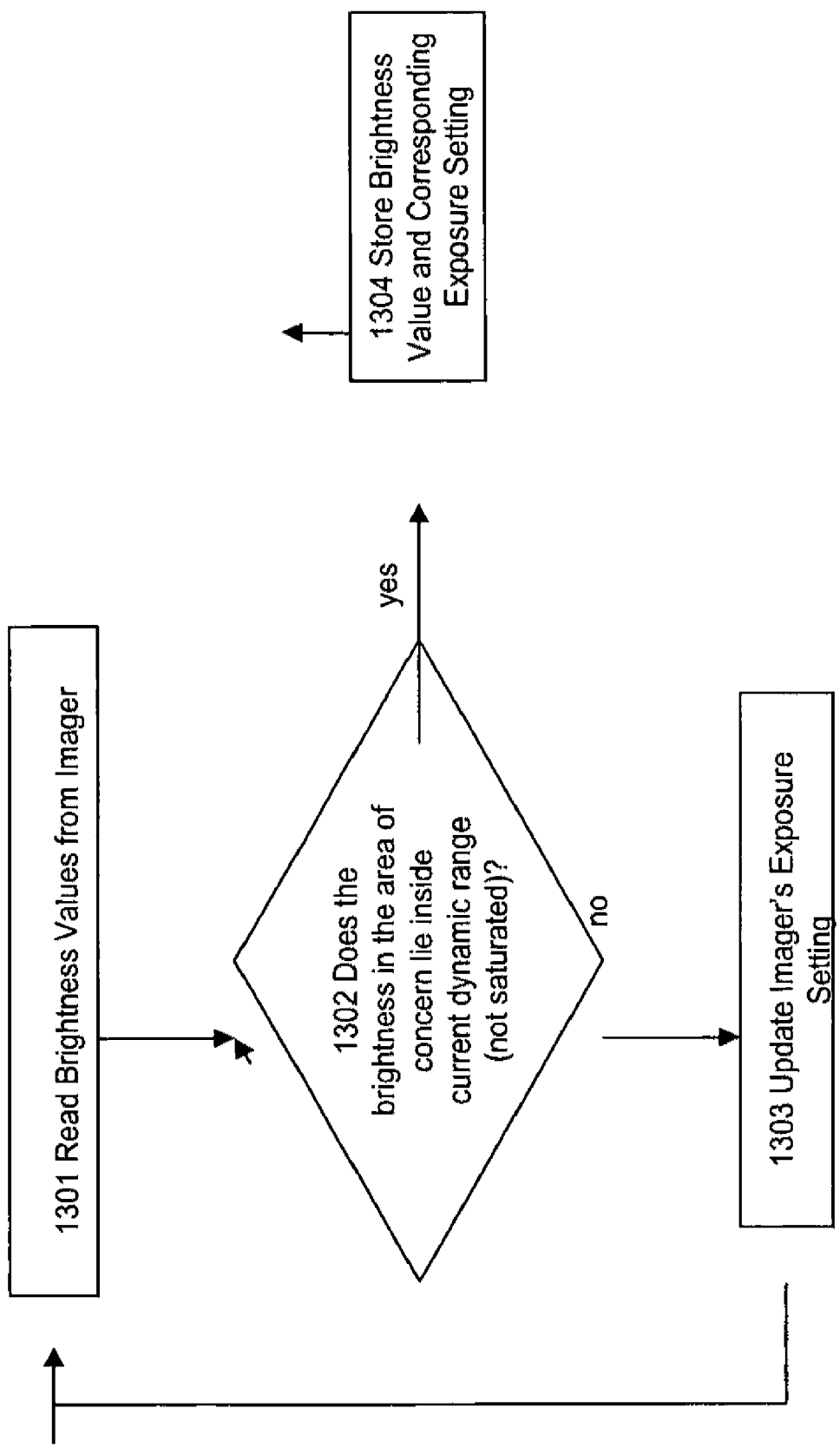
FIG. 9 is an illustration of an exemplary process for learning desirable radiance range with user interaction in differential mode.

While working in differential mode, the video sensor may require pairs of brightness values and exposure settings as described above. Again, the video sensor may optionally learn the desirable ranges from the user-controlled environment by letting the user set the lighting level in a selected area to the maximum and minimum values of the desirable range. During the learning stage, the video sensor may store the corresponding exposure setting with the brightness value that can be used as thresholds during differential operation of FIG. 7. FIG. 9 illustrates an exemplary learning stage. The exposure setting and brightness values may be read (1301). It may be determined if the measured brightness value lies within the video sensor's dynamic range (1302). If so, then the exposure-brightness pair is stored (1304). Otherwise the process is repeated by updating the exposure value accordingly (1303) until such a pair is found.

Automatic Learning of Desirable Light Ranges

Figure 10:
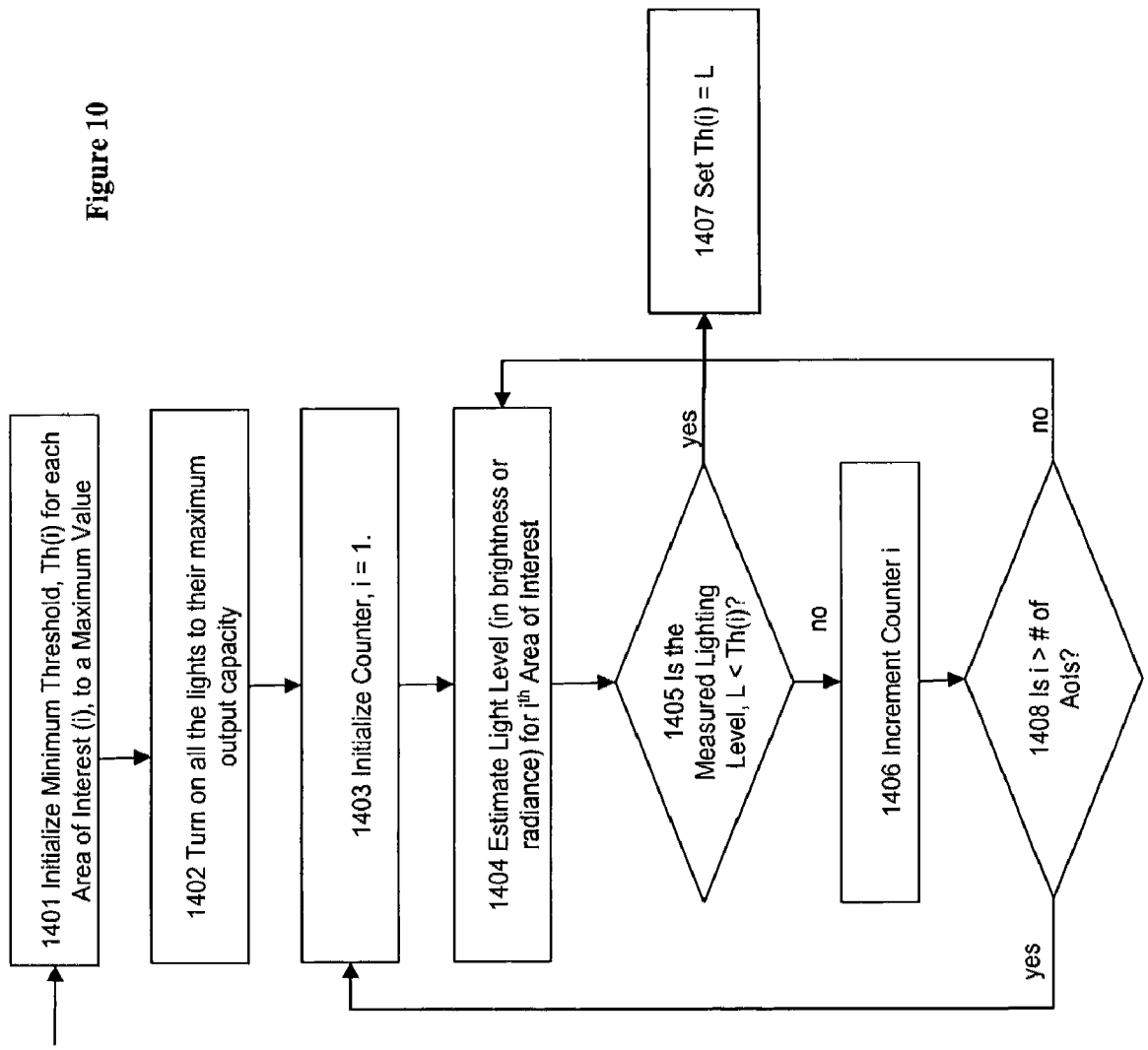
FIG. 10 is an illustration of an exemplary process for automatically learning the desirable radiance range.

In another embodiment, the video sensor may observe the lighting levels over an extended period of time, say 24 hours. The flowchart of an exemplary operation is shown in FIG. 10. The lights may be turned on at or near their maximum output levels (1402) during the calibration period. A counter is set (1403). The minimum lighting level (or multiple levels in the case of different AoIs in the scene) observed during this calibration period may be determined and stored (1405, 1407). This lighting level is used as the threshold for minimum required lighting level in the scene/AoI. The process may be repeated for a number of spaces/AoIs (1406, 1408).

Automatic Calibration

Figure 11:
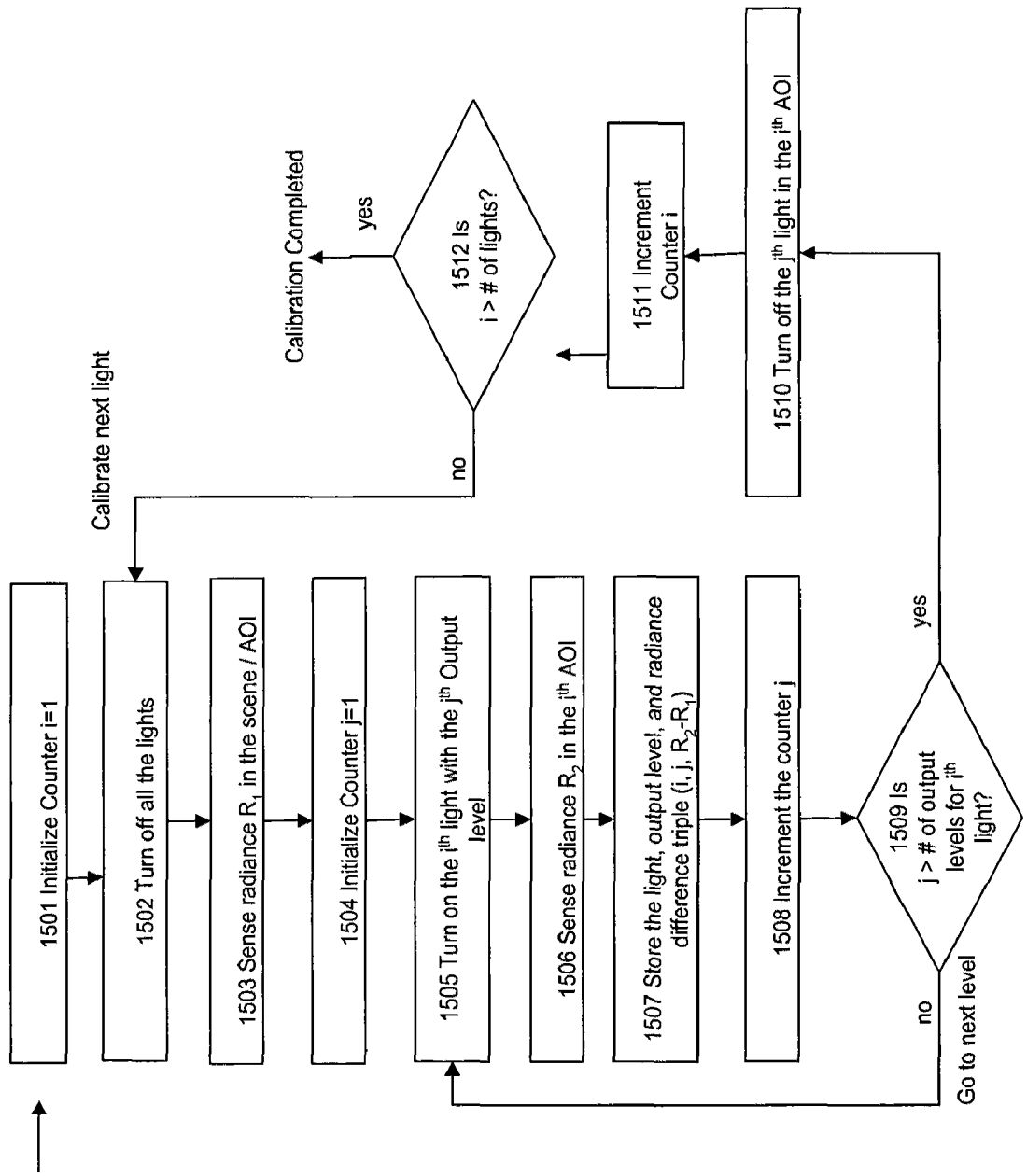
FIG. 11 is an illustration of an exemplary auto-calibration process.

To maintain a steady level of lighting, the light sources may be controlled in a continuous fashion with a feedback loop in response to changes in light conditions. To accomplish this, the effect of brightening and dimming each light source on the overall area lighting should be known. The video sensor may self-calibrate automatically to learn these effects. This auto-calibration process may be done during the set-up of the video sensor and may be repeated offline if the lighting fixtures change during the operation of video sensor. As with other modes of operation, auto-calibration may also be done independently for each area of interest. A flowchart of an exemplary self-calibration process is shown in FIG. 11. A counter is initiated (1501). All the lights may be turned off (1502) and the scene radiance measured (1503). Then, a second counter may be initiated and one of the lights turned on. The light's output level may be varied in discrete steps from its minimum to maximum value (1504, 1505). A difference between the current radiance and the radiance when the light was off may be stored along with the current output level and identity of the light (1506, 1507). The process may be repeated for each output level of the light (1508, 1509). The light is then turned off (1510) and the process is repeated for each light in the scene (1510-1512). This process may also be applied to combinations of light sources.

Determination of Light Estimate

The effect of shadows, surfaces, and other environmental factors may also be taken in to account in determining a light estimate. Other than the lighting devices, natural lighting, and imager parameters, the amount of light reflected/emitted from a world position also depends on the surface properties. The reflectance property of a surface may be defined by a Bidirectional Reflectance Distribution Function (BRDF), which gives the reflectance of a target as a function of illumination and viewing geometry. For example, a surface with specular reflectance properties such as a perfect mirror reflects the light from a single incident direction in a single direction whereas a perfect matte surface reflects the light equally in all directions.

The presence of specular materials, light sources, etc. in the field of view of the sensor may lead to erroneous illumination estimates because the amount of light reflected by these surfaces not only depends on the material, but also the position of the camera and sources with respect to it. The surface properties of the different scene regions may be estimated and classified as either specular or diffuse surfaces. Details of an exemplary process are given below. The illumination measurements from matte regions are considered more reliable than the measurements from specular regions and may be used in making the light estimate. In another implementation, instead of removing specular regions from the light estimate, specularities in the image may be separated out and the complete diffuse image utilized.

Finding Specular Regions in the Scene

Figure 12:
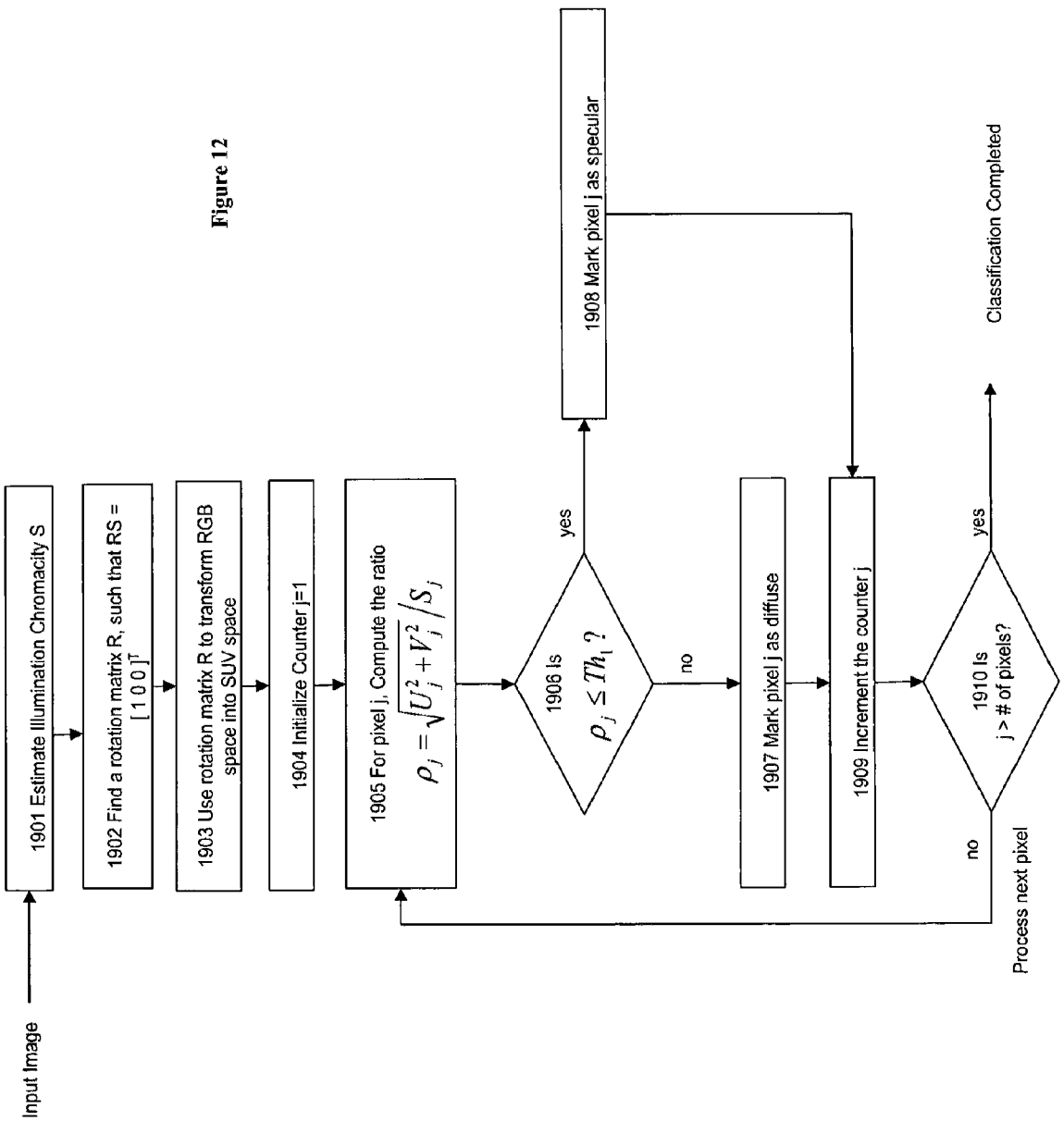
FIG. 12 is an illustration of an exemplary process for finding specular regions in the scene.
Figure 13:
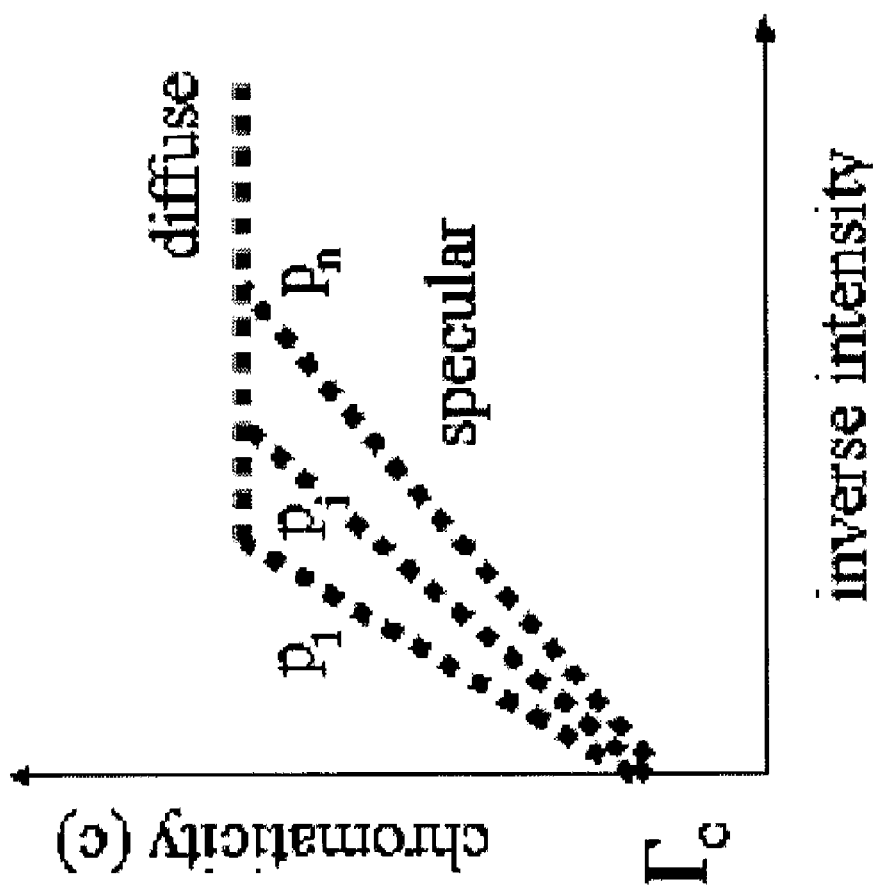
FIG. 13 is an illustration of inverse-intensity chromaticity space of an image

An exemplary process for finding specular regions is shown in FIG. 12. To separate specularities in the scene, the illumination color in the scene may be estimated (1901). The illumination color may be estimated by analyzing the inverse-intensity chromaticity space an example of which is shown in (FIG. 13), where image chromaticity, c(x), is defined as $$c(x) = \frac{I_c(x)}{\sum_i I_i(x)}.$$

The illumination color component may be estimated as the point of intersection of lines in inverse-intensity chromaticity space formed by specular pixels (FIG. 13) [R. T. Tan, K. Nishino and K. Ikeuchi, "Illumination Chromaticity Estimation using Inverse-Intensity Chromaticity Space", CVPR 2003.].

A rotation matrix R, such that RS=[1 0 0] may be determined (1902). Using the illumination color, S, the RGB image may be transformed using the rotation matrix (1903) to a new data-dependent color space known as the SUV space and a counter set (1904). [See S. P. Mallick, T. E. Zickler, D. J. Kriegman, and P. N. Belhumeur, "Beyond Lambert: Reconstructing Specular Surfaces using Color," IEEE Conference on Computer Vision and Pattern Recognition, June 2005].

One component (S) is a mixture of the diffused and specular parts whereas the other two components (U and V) are purely diffused. An example image with its S, U, and V components are shown in FIG. 14. Since the components U and V are purely diffuse, the specular regions have low values in these components, whereas they have high values in the specular S component. Thus, the ratio of the diffuse and specular component can be used to detect specular regions in the images. In particular, the ratio of the norm of diffused components and the specular S-component, i.e., $\sqrt{U^2+V^2}/S$ may be computed (1905). The pixels that have values lower than a predetermined threshold are classified and marked as specular (1906, 1908), otherwise they are classified as diffuse (1907). The process may be repeated until all pixels are processed (1909, 1910). An example of diffuse and specular pixels identified this way is shown in FIG. 15. The specular regions/pixels may be excluded when the radiance is estimated from the high dynamic range or brightness images to make the system robust to the position of the camera, scene geometry, and the presence of illuminants and specularities in the images.

Computing Diffuse Image

Instead of removing areas with predominant specular reflectance for the computation of light estimates, an alternative is to compute the diffuse image of the scene, i.e., an image that only consists of diffuse components of the surface reflections. One possible embodiment may transform the image into SUV space as described in the section above. Since U and V are purely diffuse components, they combine to form a 2-channel diffuse image.

Figure 17:
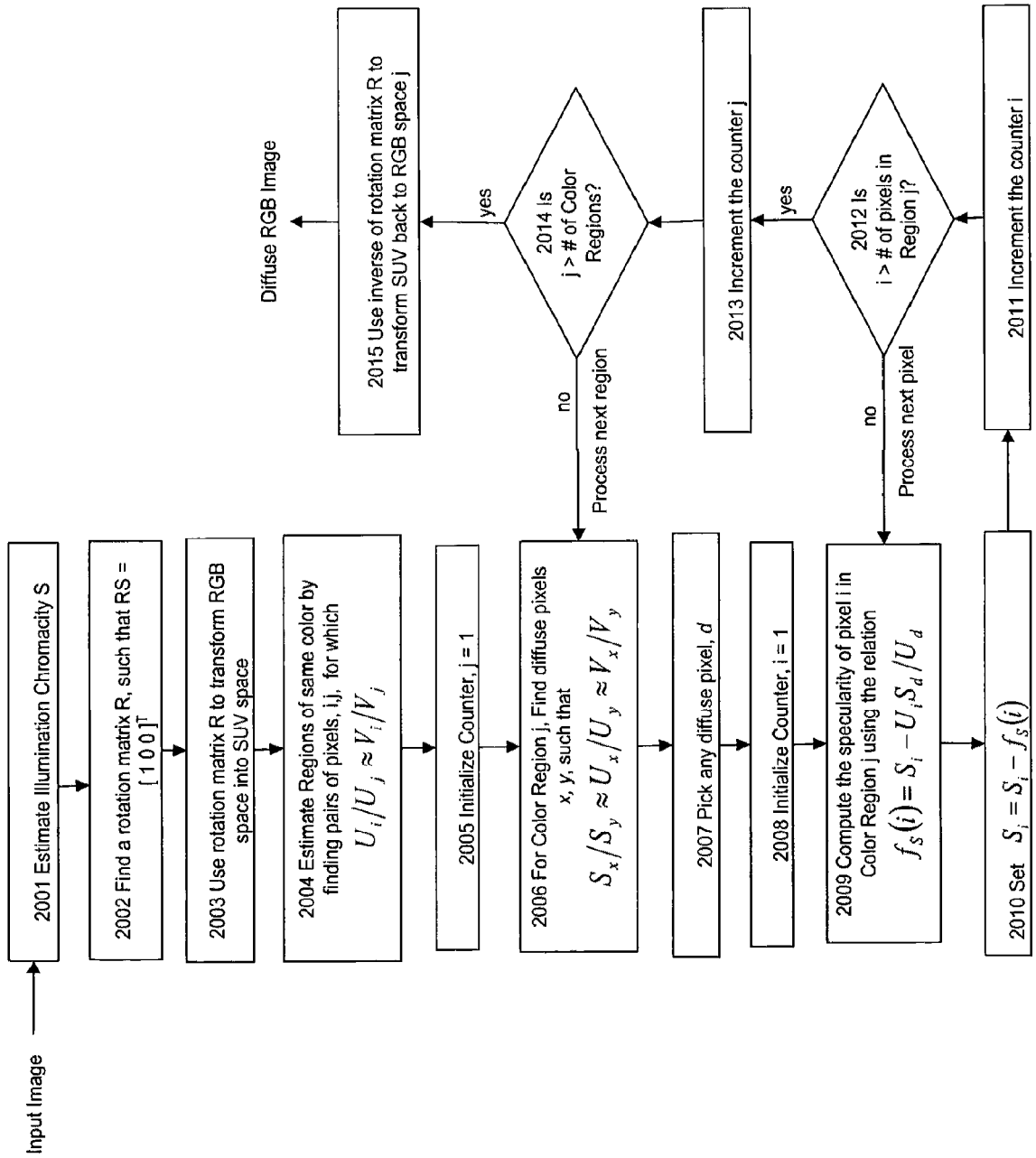
FIG. 17 is an illustration of an exemplary process for computing diffuse RGB image.

In another embodiment, a 3-channel diffuse image may be determined by first identifying purely diffuse pixels in the image and then utilizing each diffuse pixel to remove the specular components of the pixels of the same color. FIG. 16 illustrates an example of a 3-channel diffuse image. FIG. 17 illustrates an exemplary process for determining the diffuse image. The RGB color space may be transformed into SUV space, for example, as described in the previous section (2001-2003). The diffuse components U and V of each pair of pixels may be used to determine whether the pixels have the same surface color or not. This may be done by comparing the ratios of their U and V components. If these ratios are approximately equal, i.e., $U_1/U_2 \approx V_1/V_2$, the pixels may be recognized as having the same surface color (2004). A counter may be set (2005). Once the pixels with same surface color are identified, then for each color region, the diffused pixels are determined. For determining whether a pixel is diffused, the sensor considers two pixels of same surface color. If both are diffused, then the ratio of the S components must be equal to the ratio of the U and V components, i.e., $S_1/S_2 \approx U_1/U_2 \approx V_1/V_2$ (2006). After the diffused pixels are determined for each color region, then the specularity $f_S(i)$ of each remaining pixel i of the same color may be found out using the relation, $$f_s(i) = S_i - \frac{U_i}{U_d}S_d,$$

where the subscripts i and d respectively denote the pixel i and a diffuse pixel of the same color (2007-2009). The specular component for the pixel may be subtracted from the S component (2010). The process may be repeated for each pixel and each color region. Finally the new S component may be combined with the U and V components to obtain the diffuse RGB image (2015).

Exemplary Sensor Designs and Systems

Figure 18:
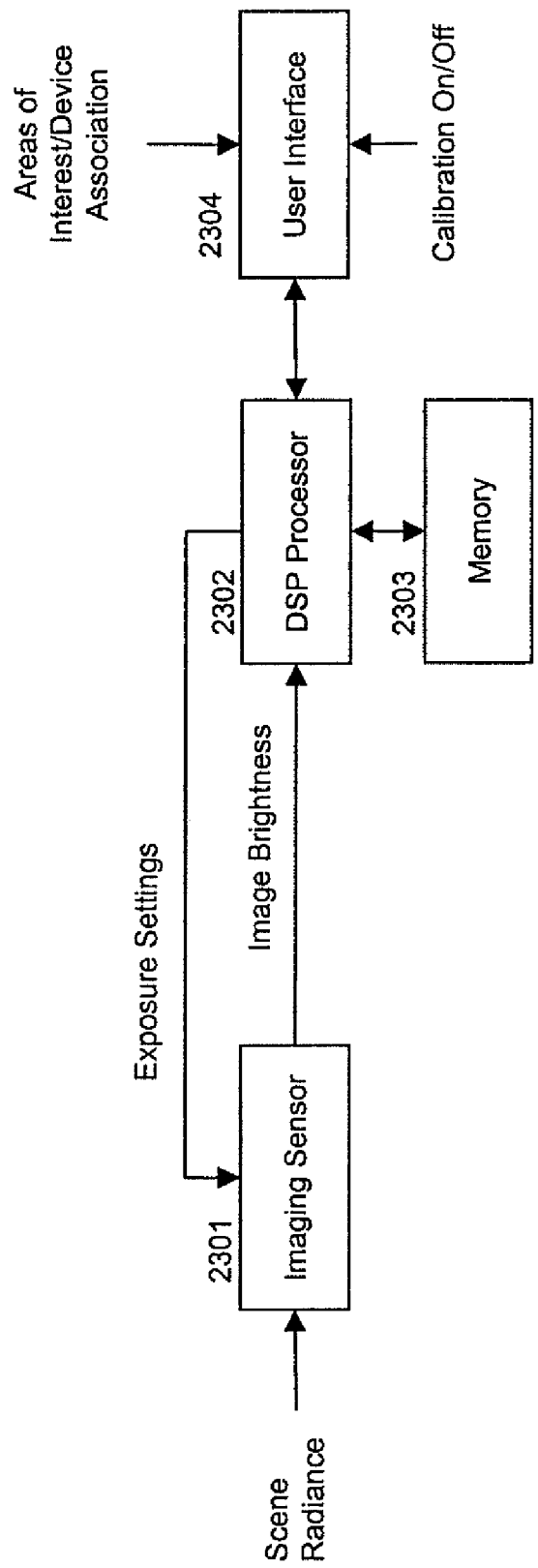
FIG. 18 is an illustration of an exemplary embodiment of a video based photo-sensor.

Examples of the sensor and system may include an embedded system involving a DSP processor that reads the brightness values from the imaging sensor and implements the processes defined in the previous section for interpreting the output of imaging sensor, calibration, and communication with lighting control system. In one exemplary implementation shown in FIG. 18 the processor (2302) may read the image brightness for each pixel from the imager (2301) and convert the brightness into the corresponding radiance by the mechanism described in FIG. 5. A memory (2303) may store the radiance. The radiance estimates per pixel may be output via the communications network (12) to the controller (13), for example, in FIG. 1 for control and other applications. An exemplary implementation of the imager (2301) is shown in FIG. 4.

Another exemplary embodiment may provide a user interface (2304) to define areas of interest in the image regions and to associate different lighting devices with different areas in the image. The user interface may also be used to calibrate the sensor to specify the range of desirable illumination level for a given image region. In this case, the sensor may simply be programmed to output whether the illumination in the specified region is higher or lower than the desired range instead of providing the actual radiance estimates. In the case the illumination is lower (higher) than the desired range, a feedback mechanism can be used to brighten (dim) the lights in the area of concern to a desirable setting. The user interface may also be used to specify to provide other control signals such as auto-calibration and desired lighting levels to the sensor (2304).

In addition to the DSP based embedded sensor, another implementation of the sensor involves a new preprogrammed Application Specific Integration Circuit (ASIC) sensor technology. An application-specific integrated circuit is a Very Large Scale Integrated (VLSI) circuit, custom-designed to perform one or more particular functions. In this case, the VLSI is designed to implement the illumination sensing, control and/or other processes described in the claims section. The ASIC technology is cost effective and durable. It also reduces the size of the product by requiring fewer peripheral components and minimizing the number of parts that can possibly fail.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

The invention claimed is:

1. A method of video-based day-lighting control, comprising:
    a. receiving video image information about a scene, the video image information comprising an image sequence including a plurality of images of the scene;
    b. determining a light estimate for the scene based on the video image information;
    c. regulating light provided to the scene based on the light estimate wherein the determining further comprises:
        setting an exposure to a predetermined maximum exposure;
        determining a brightness with the exposure set to the maximum exposure;
        reducing the light to the scene if the measured brightness is larger than a predetermined maximum brightness;
        setting the exposure to a predetermined minimum exposure;
        determining a brightness with the exposure set to the minimum exposure; and
        increasing the light to the scene if the measured brightness is less than a predetermined minimum brightness.

2. The method of claim 1, wherein the light estimate comprises a brightness value.

3. The method of claim 1, further comprising determining a radiance based on the brightness.

4. The method of claim 3, wherein determining the radiance comprises:
   determining a radiance based on the brightness with a current exposure; and
   adjusting the current exposure if the radiance is outside a range and repeating until the radiance at each image location is determined.

5. The method of claim 1, wherein the light estimate comprises radiance.

6. The method of claim 5, wherein determining the radiance comprises:
   capturing image information with a variety of exposures;
   estimating a response function based on the image information; and
   creating a radiance map based on the response function.

7. The method of claim 1, further comprising:
   a. defining a plurality of areas of interest within the space; and
   b. individually controlling the light in the respective areas of interest based on the video image information from one video sensor.

8. The method of claim 7, wherein the defining comprises at least one of:
   c. receiving user input via a graphical user interface;
   d. locating markers to denote boundaries of the areas of interest;
   e. pacing out the areas of interest while the sensor is in a learning mode;
   f. learning the space usage based on statistics; or
   g. by the sensor learning the effect of each artificial light in the area by turning the light on and off.

9. The method of claim 1, wherein determining the light estimate further comprises:
   defining a range of light levels for the scene; and
   determining if the light is within the range.

10. The method of claim 9, wherein the range is determined at least one of manually or automatically.

11. The method of claim 1, wherein determining the light estimate further comprises:
    locating specular regions in the scene; and
    determining the light estimate excluding the specular regions.

12. The method of claim 1, wherein determining the light estimate further comprises:
    computing a diffuse image for the scene; and
    determining the light estimate based on the diffuse image.

13. The method of claim 7, wherein step b comprises providing control signals for a plurality of light sources to control an amount of light.

14. A method of video-based day-lighting control, comprising:
    a. receiving video image information about a scene, the video image information comprising an image sequence including a plurality of images of the scene;
    b. determining a light estimate for the scene based on the video image information, including, 1) determining a respective measured brightness with the scene set to a minimum of a range and set to a maximum of the range;
    2) storing the measured brightness value and corresponding exposure for which the measured brightness is within a dynamic range of the sensor; and 3) updating the exposure if the measured brightness is outside the dynamic range of the sensor and returning to step (2); and
    c. regulating light provided to the scene based on the light estimate.

15. The method of claim 14, wherein the light estimate comprises a brightness value.

16. The method of claim 14, further comprising determining a radiance based on the brightness.

17. The method of claim 16, wherein determining the radiance comprises:
    determining a radiance based on the brightness with a current exposure; and
    adjusting the current exposure if the radiance is outside a range and repeating until the radiance at each image location is determined.

18. The method of claim 14, wherein the light estimate comprises radiance.

19. The method of claim 18, wherein determining the radiance comprises:
    capturing image information with a variety of exposures;
    estimating a response function based on the image information; and
    creating a radiance map based on the response function.

20. The method of claim 14, further comprising:
    defining a plurality of areas of interest within the space; and
    individually controlling the light in the respective areas of interest based on the video image information from one video sensor.

21. The method of claim 20, wherein the defining comprises at least one of:
    a. receiving user input via a graphical user interface;
    b. locating markers to denote boundaries of the areas of interest;
    c. pacing out the areas of interest while the sensor is in a learning mode;
    d. learning the space usage based on statistics; or
    e. by the sensor learning the effect of each artificial light in the area by turning the light on and off.

22. The method of claim 14, wherein determining the light estimate further comprises:
    defining a range of light levels for the scene; and
    determining if the light is within the range.

23. The method of claim 22, wherein the range is determined at least one of manually or automatically.

24. The method of claim 14, wherein determining the light estimate further comprises:
    locating specular regions in the scene; and
    determining the light estimate excluding the specular regions.

25. The method of claim 14, wherein determining the light estimate further comprises:
    computing a diffuse image for the scene; and
    determining the light estimate based on the diffuse image.

26. The method of claim 20, wherein individually controlling the light comprises providing control signals for a plurality of light sources to control an amount of light.

* * * * *